US012731285B2

(12) United States Patent
Yang et al.

(10) Patent No.: US 12,731,285 B2
(45) Date of Patent: Sep. 8, 2026

(54) FACE POSE ESTIMATION METHOD AND APPARATUS, ELECTRONIC DEVICE, AND STORAGE MEDIUM

(71) Applicant: SHENZHEN XUMI YUNTU SPACE TECHNOLOGY CO., LTD., Shenzhen (CN)

(72) Inventors: Zhanbo Yang, Shenzhen (CN); Zeyuan Huang, Shenzhen (CN); Xiaoting Qi, Shenzhen (CN); Zhao Jiang, Shenzhen (CN)

(73) Assignee: SHENZHEN XUMI YUNTU SPACE TECHNOLOGY CO., LTD., Shenzhen (CN)

( * ) Notice: Subject to any disclaimer, the term of this patent is extended or adjusted under 35 U.S.C. 154(b) by 205 days.

(21) Appl. No.: 18/834,647

(22) PCT Filed: Jul. 26, 2022

(86) PCT No.: PCT/CN2022/107825
§ 371 (c)(1),
(2) Date: Jul. 31, 2024

(87) PCT Pub. No.: WO2023/151237
PCT Pub. Date: Aug. 17, 2023

(65) Prior Publication Data

US 2025/0037305 A1 Jan. 30, 2025

(30) Foreign Application Priority Data

Feb. 11, 2022 (CN) ........................ 202210129785.7

(51) Int. Cl.
*G06T 7/73* (2017.01)
*G06T 7/10* (2017.01)
*G06V 10/82* (2022.01)

(52) U.S. Cl.
CPC .................. *G06T 7/73* (2017.01); *G06T 7/10* (2017.01); *G06T 2207/20081* (2013.01); *G06T 2207/20132* (2013.01); *G06T 2207/30201* (2013.01)

(58) Field of Classification Search
USPC ........................ 382/100, 118, 155–156, 159
See application file for complete search history.

(56) References Cited

U.S. PATENT DOCUMENTS 6,959,109 B2 * 10/2005 Moustafa ............ G06V 10/242 382/117
10,467,458 B2 * 11/2019 Wang ................. G06F 18/2413
(Continued)

FOREIGN PATENT DOCUMENTS

CN 108256454 A 7/2018
CN 110837773 A 2/2020
(Continued)

OTHER PUBLICATIONS

Fang et al., MR-CapsNet: A Deep Learning Algorithm for Image-Based Head Pose Estimation on CapsNet, IEEE Access, Digital Object identifier 10.1109/ACCESS.2011.3119615, pp. 141245-141257 . (Year: 2021).*
(Continued)

*Primary Examiner* — Ishrat I Sherali
(74) *Attorney, Agent, or Firm* — Bayramoglu Law Offices LLC

(57) ABSTRACT

The provided are a face pose estimation method and apparatus, an electronic device, and a storage medium. The method includes: obtaining a target image containing face information, and inputting the target image into a pre-constructed pose estimation model; performing feature extraction on the target image by using a shallow densely connected layer to obtain a plurality of first feature maps containing shallow feature information; performing an infor-
(Continued)

mation fusion operation on the plurality of first feature maps by using a deep feature multiplexing layer to obtain a second feature map, such that deep feature information is fused into the shallow feature information; and extracting face pose information in the second feature map by using an attention layer to obtain a third feature map containing the face pose information, performing prediction on the third feature map by using a classifier, and determining a face pose in the target image.

9 Claims, 3 Drawing Sheets

(56) References Cited

U.S. PATENT DOCUMENTS

| | | | | |
|---|---|---|---|---|
| 12,205,317 | B2 * | 1/2025 | Fu | G06V 10/82 |
| 12,354,405 | B1 * | 7/2025 | Liu | G06V 10/82 |
| 12,361,584 | B2 * | 7/2025 | Chen | G06T 7/11 |
| 2008/0152218 | A1 * | 6/2008 | Okada | G06V 40/103<br>382/159 |
| 2015/0347822 | A1 * | 12/2015 | Zhou | G06V 10/82<br>382/118 |
| 2018/0150681 | A1 * | 5/2018 | Wang | G06V 40/172 |
| 2019/0026538 | A1 * | 1/2019 | Wang | G06V 40/172 |
| 2024/0338974 | A1 * | 10/2024 | Lee | G06V 40/176 |

FOREIGN PATENT DOCUMENTS

| | | | |
|---|---|---|---|
| CN | 108256454 | B | 8/2020 |
| CN | 112766186 | A | 5/2021 |
| CN | 113901884 | A | 1/2022 |
| CN | 114519881 | A | 5/2022 |
| JP | 2020113000 | A | 7/2020 |

OTHER PUBLICATIONS

Shi et al. Human Pose Estimation Based on the Multistage Learning and Dense Connection, 2020 IEEE, ISBN (Electronic): 978-0-7381-0545-1, 2020 13th International Congress on Image and Signal Processing, BioMedical Engineering and Informatics (CISP-BMEI), p. 1-6.. (Year: 2020).*

Chaoqun Hong, et al., Multimodal Face-Pose Estimation with Multitask Manifold Deep Learning, IEEE Transactions on Industrial Informatics, 2019, pp. 3952-3961, vol. 15, No. 7.

Zhansheng Xiong, et al., Deep Spatial-Temporal Field for Human Head Orientation Estimation, (Eds.): ICONIP 2019, LNCS 11955, 2019, pp. 499-509.

Heng Song, et al., An multi-task head pose estimation algorithm, 2021 5th Asian Conference on Artificial Intelligence Technology (ACAIT), 2021, pp. 174-181.

Bharindra Kamanditya, et al., Convolution Neural Network for Pose Estimation of Noisy Three-Dimensional Face Images, 2018 IEEE 5th International Conference on Engineering Technologies & Applied Sciences, 2018.

* cited by examiner

FACE POSE ESTIMATION METHOD AND APPARATUS, ELECTRONIC DEVICE, AND STORAGE MEDIUM

CROSS-REFERENCE TO THE RELATED APPLICATIONS

This application is the national phase entry of International Application No. PCT/CN2022/107825, filed on Jul. 26, 2022, which is based upon and claims priority to Chinese Patent Application No. 202210129785.7, filed on Feb. 11, 2022, the entire contents of which are incorporated herein by reference.

TECHNICAL FIELD

The present disclosure relates to the field of computer technologies, and in particular, to a face pose estimation method and apparatus, an electronic device, and a storage medium.

BACKGROUND

Face pose estimation is an important research direction in the field of computer vision, and a face pose change is also a key factor influencing a face recognition effect. The influence of a face pose on the face recognition effect can be further weakened by effectively estimating the pose of a face image. The face pose estimation also has wide application in the field of computer vision, such as living body recognition, human-computer interaction, virtual reality, intelligent monitoring, or the like.

In a current traditional face pose estimation method, some irrelevant facial features are ignored by capturing pose angle information, such that the face and surrounding information cannot be fully used for model optimization, and key information of the face pose cannot be fully acquired by a traditional way of face pose recognition based on a general recognition model. In the traditional face pose estimation method, a detected face box is directly taken as input, and inaccuracy of the face box is not considered, such that the traditional face pose estimation method cannot obtain an optimal prediction effect when pose angles are directly regressed or classified, thereby reducing accuracy of a face pose estimation result.

SUMMARY

In view of this, embodiments of the present disclosure provide a face pose estimation method and apparatus, an electronic device, and a storage medium, so as to solve the problems in the prior art that key information of a face pose cannot be fully acquired and accuracy of a face pose estimation result is poor.

In a first aspect of the embodiments of the present disclosure, there is provided a face pose estimation method, including: obtaining a target image containing face information, and inputting the target image into a pre-constructed pose estimation model; in the pose estimation model, performing feature extraction on the target image by using a shallow densely connected layer to obtain a plurality of first feature maps containing shallow feature information; taking the plural first feature maps as input of a deep feature multiplexing layer, and performing an information fusion operation on the plurality of first feature maps by using the deep feature multiplexing layer to obtain a second feature map, such that deep feature information is fused into the shallow feature information; and extracting face pose information in the second feature map by using an attention layer to obtain a third feature map containing the face pose information, performing prediction on the third feature map by using a classifier to obtain a face pose prediction result corresponding to the third feature map, and determining a face pose in the target image according to the prediction result.

In a second aspect of the embodiments of the present disclosure, there is provided a face pose estimation apparatus, including: an obtaining module configured to obtain a target image containing face information, and input the target image into a pre-constructed pose estimation model; an extracting module configured to, in the pose estimation model, perform feature extraction on the target image by using a shallow densely connected layer to obtain a plurality of first feature maps containing shallow feature information; a fusing module configured to take the plural first feature maps as input of a deep feature multiplexing layer, and perform an information fusion operation on the plurality of first feature maps by using the deep feature multiplexing layer to obtain a second feature map, such that deep feature information is fused into the shallow feature information; and a predicting module configured to extract face pose information in the second feature map by using an attention layer to obtain a third feature map containing the face pose information, perform prediction on the third feature map by using a classifier to obtain a face pose prediction result corresponding to the third feature map, and determine a face pose in the target image according to the prediction result.

In a third aspect of the embodiments of the present disclosure, there is provided an electronic device, including a memory, a processor and a computer program stored on the memory and runnable on the processor, wherein the processor, when executing the program, implements the steps of the above method.

In a fourth aspect of the embodiments of the present disclosure, there is provided a computer-readable storage medium storing a computer program, wherein the computer program, when executed by a processor, implements the steps of the above method.

At least one of the above technical solutions adopted in the embodiments of the present disclosure can achieve the following beneficial effects.

The target image containing the face information is obtained, and the target image is input into the pre-constructed pose estimation model; in the pose estimation model, feature extraction is performed on the target image by using the shallow densely connected layer to obtain the plurality of first feature maps containing the shallow feature information; the plural first feature maps are taken as the input of the deep feature multiplexing layer, and the information fusion operation is performed on the plurality of first feature maps by using the deep feature multiplexing layer to obtain the second feature map, such that the deep feature information is fused into the shallow feature information; the face pose information in the second feature map is extracted by using the attention layer to obtain the third feature map containing the face pose information, prediction is performed on the third feature map by using the classifier to obtain the face pose prediction result corresponding to the third feature map, and the face pose in the target image is determined according to the prediction result. According to the present disclosure, the key information of the face pose can be fully obtained, such that the face pose estimation result is more precise.

BRIEF DESCRIPTION OF THE DRAWINGS

In order to more clearly illustrate the technical solutions in the embodiments of the present disclosure, the accompanying drawings used in the description of the embodiments or the prior art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION OF THE EMBODIMENTS

In the following description, for the purpose of illustration instead of limitation, specific details such as a particular system structure and a technology are provided to make the embodiments of the present disclosure understood thoroughly. However, it should be understood by those skilled in the art that the present disclosure can also be implemented in other embodiments without the specific details. In other cases, detailed description of well-known systems, apparatuses, circuits and methods is omitted, so that the present disclosure is described without being impeded by unnecessary details.

In a face pose estimation task, due to diversity of positions and sizes of faces in images, differences of different faces at all angles, a complex background environment and other factors, difficulty is brought to precise estimation of a face pose angle by an algorithm.

In a traditional face pose estimation algorithm, a detected face box is directly used as input, inaccuracy of the face box is not considered, and the face and surrounding information cannot be fully utilized for model optimization. Pose estimation requires capture of pose angle information and neglect of some irrelevant facial features, and a traditional backbone network and Neck module based on a general recognition model cannot sufficiently acquire pose key information due to lack of effective design. In addition, the traditional method of directly regressing or classifying angles is too direct, and cannot obtain an optimal effect. Therefore, the traditional face pose estimation method cannot obtain an optimal prediction effect when the pose angles are directly regressed or classified, thereby reducing accuracy of a face pose estimation result.

In view of the above problems in the prior art, the present disclosure provides a brand-new face pose estimation method based on a pose estimation model of a neural network, and the neural network model of the present disclosure mainly includes a backbone network, a Neck module and a Head module. When the pose estimation model is trained, an adopted training set includes pose annotations of a face box and a plurality of point positions, and the pose annotations include pose annotation information consisting of plural annotation points of the face box and a plurality of pose angles. An original image is reserved, and data augmentation is carried out on the basis of the original image, so as to realize augmented training of the pose estimation model. Shallow features and deep features in a face image are fused by using the backbone network consisting of a shallow densely connected layer and a deep feature multiplexing layer in the pose estimation model, and the pose angle of the face in the image is precisely estimated based on an attention module and a grouping angle regression module.

Figure 1:
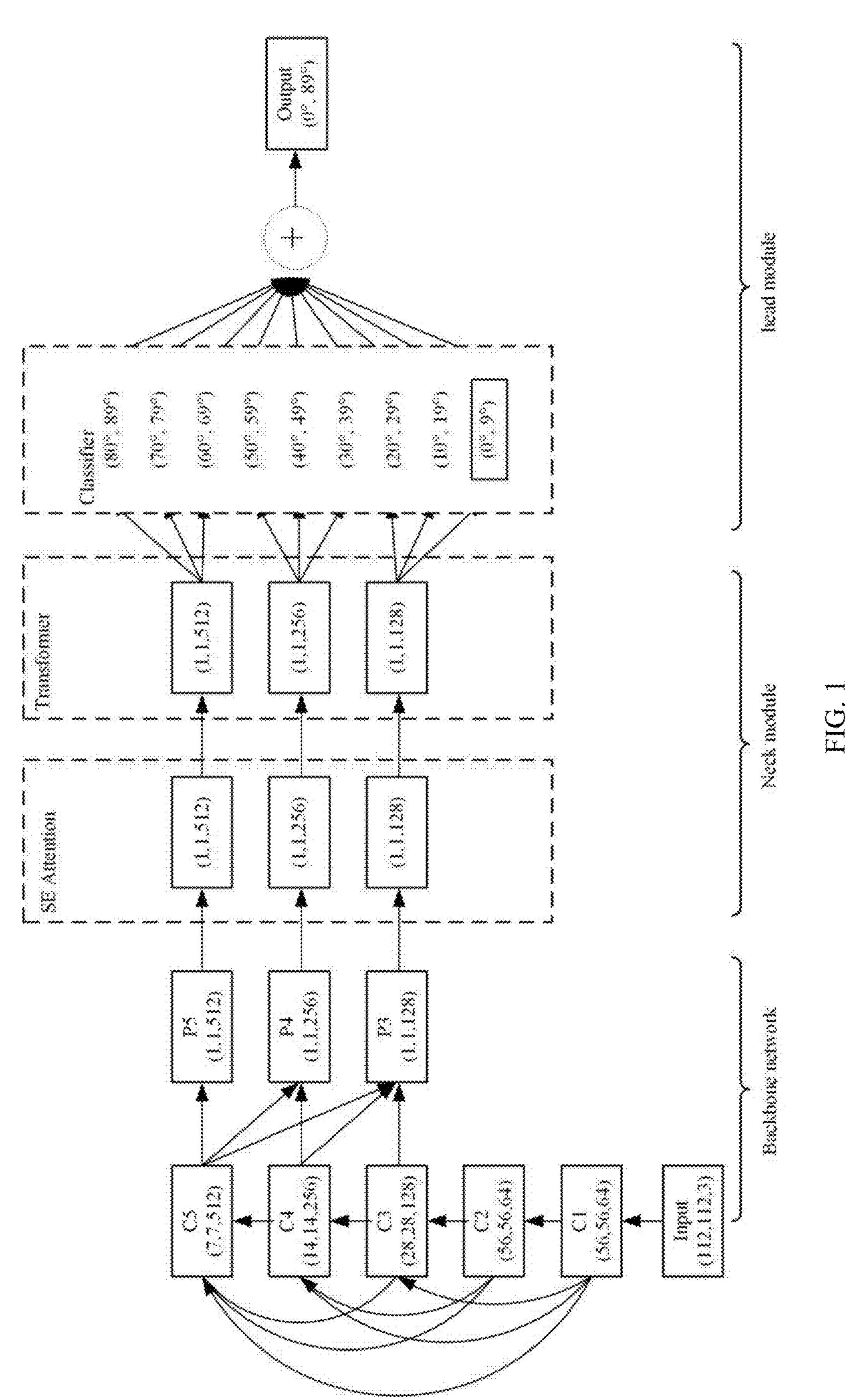
FIG. 1 is a schematic diagram of a network structure of a pose estimation model in an embodiment of the present disclosure.

A network structure of the pose estimation model in the present disclosure is described in detail below with reference to the accompanying drawings, and FIG. 1 is a schematic diagram of the network structure of the pose estimation model in an embodiment of the present disclosure; as shown in FIG. 1, the network structure of the pose estimation model may be specifically as follows.

The backbone network includes the shallow densely connected layer (corresponding to C1-C5) and the deep feature multiplexing layer (corresponding to P3-P5), the shallow densely connected layer is mainly configured to extract forward features in the face image, and dense connection means that output of each module is used as both input of a next module and input of other modules after the next module; the deep feature multiplexing layer is configured to fuse deep feature information into extracted shallow feature information during feature expression, so as to obtain a feature map containing more semantic information (i.e., pose information).

The Neck module consists of a squeeze-and-excitation (SE) attention module and a Transformer-based feature transformation module, and the SE attention module amplifies important features by weighting features of different channels, and meanwhile inhibits relatively unimportant features. Transformer has a strong feature extraction capability through ingenious structural design, and extracts effective features using a multi-head attention mechanism, such that the important features in the feature map are highlighted, and interference features are suppressed.

The Head module corresponds to the grouping angle regression module (i.e., a classifier), a plurality of classifiers are arranged for each face pose, each classifier predicts probability values corresponding to a plurality of angles, prediction results of the classifiers are calculated according to the probability values corresponding to the angles, and finally, the prediction results of all the classifiers are added to obtain the final estimation result. Thus, angle values corresponding to all the poses in the face image are determined.

Figure 2:
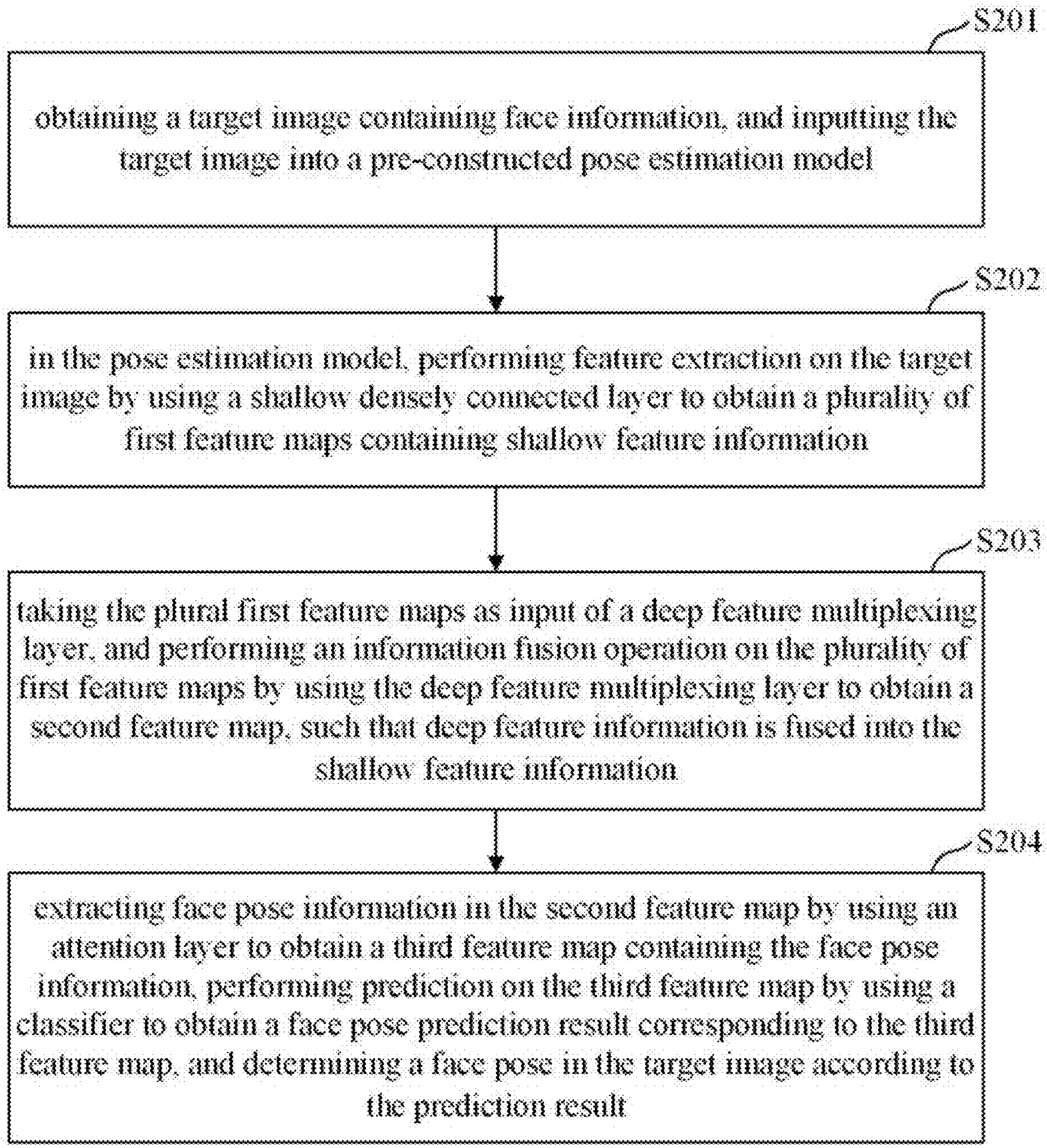
FIG. 2 is a schematic flow diagram of a face pose estimation method according to an embodiment of the present disclosure.

FIG. 2 is a schematic flow diagram of a face pose estimation method according to an embodiment of the present disclosure. The face pose estimation method of FIG. 2 may be performed by a server. As shown in FIG. 2, the face pose estimation method may specifically include:

- S201: obtaining a target image containing face information, and inputting the target image into a pre-constructed pose estimation model;
- S202: in the pose estimation model, performing feature extraction on the target image by using a shallow densely connected layer to obtain a plurality of first feature maps containing shallow feature information;
- S203: taking the plural first feature maps as input of a deep feature multiplexing layer, and performing an information fusion operation on the plurality of first feature maps by using the deep feature multiplexing layer to obtain a second feature map, such that deep feature information is fused into the shallow feature information; and S204: extracting face pose information in the second feature map by using an attention layer to obtain a third feature map containing the face pose information, performing prediction on the third feature map by using a classifier to obtain a face pose prediction result corresponding to the third feature map, and determining a face pose in the target image according to the prediction result.

Specifically, the target image in the embodiment of the present disclosure refers to a face image obtained by performing face detection on a collected original image; that is, the input of the pose estimation model is the face image obtained after face detection, and is not the original image. Before the pose angle is predicted by the pose estimation model, the pose estimation model is required to be constructed and trained, and then, the trained pose estimation model is used as a model in actual use.

Further, in the face pose estimation method according to the embodiment of the present disclosure, by using the face image after detection (i.e., the target image) as the input of the pose estimation model, the pose estimation model is used for prediction, and 3 pose angles, i.e., a pitch angle, a yaw angle, and a roll angle, are output. Since face boundaries do not have completely unified standards due to the differences of different faces and face detection models, the pose estimation model obtained by performing training using the face image after detection has better robustness.

According to the technical solution of the embodiment of the present disclosure, the target image containing the face information is obtained, and the target image is input into the pre-constructed pose estimation model; in the pose estimation model, feature extraction is performed on the target image by using the shallow densely connected layer to obtain the plurality of first feature maps containing the shallow feature information; the plural first feature maps are taken as the input of the deep feature multiplexing layer, and the information fusion operation is performed on the plurality of first feature maps by using the deep feature multiplexing layer to obtain the second feature map, such that the deep feature information is fused into the shallow feature information; the face pose information in the second feature map is extracted by using the attention layer to obtain the third feature map containing the face pose information, prediction is performed on the third feature map by using the classifier to obtain the face pose prediction result corresponding to the third feature map, and the face pose in the target image is determined according to the prediction result. According to the present disclosure, the key information of the face pose can be fully obtained, such that the face pose estimation result is more precise.

In some embodiments, the pose estimation model is constructed by: acquiring an original image containing face information, detecting the original image by using a face detection model to obtain a face image and a face box corresponding to the original image, acquiring face pose information in the original image, and generating a first data set by using the face image, position coordinates of the face box and the face pose information; cutting the original image in a preset cutting mode based on the original image and the position coordinates of the face box to obtain a cut face image, and generating a second data set by using the cut face image, the position coordinates of the face box and the face pose information; and combining the first data set and the second data set to obtain a training set, and training the pose estimation model by using the training set to obtain the trained pose estimation model.

Specifically, the training of the pose estimation model mainly includes two parts: annotation of the data set and data augmentation during training, and the two parts are described in detail below in conjunction with specific embodiments, and may specifically include the following content:

during annotation of the data set, for a batch of data sets to be annotated, 3 pose angles corresponding to the face in each original image X are acquired by using a traditional algorithm, and marked as p (pitch angle), y (yaw angle) and r (roll angle) respectively. Then, face detection is performed using a RetinaFace model to obtain the face box, and coordinates (x1, y1) of an upper left corner corresponding to the face box as well as a width (w) and a height (h) of the face box are determined. The original image X is reserved, and an image label is recorded as Y=[p, y, r, x1, y1, w, h].

Further, in the face box obtained after the face detection, the coordinates of the upper left corner as well as the width and the height can be used as 4 annotation points corresponding to a detection box (i.e., the face box), and coordinates of four vertexes corresponding to a rectangle of the face box can also be used as the 4 annotation points. In this way, the annotation information in the training set contains 7 pose annotations, i.e., the 4 annotation points of the detection box and the 3 pose angles. The face image after detection and the annotation information consisting of the 7 pose annotations are taken as the first data set.

In the data augmentation operation during training, the face image in the original image is cut in a random range according to a certain cutting proportion (such as 0.5) based on the original image in a random cutting augmentation mode; for example, a face image slightly larger than the face detection box (1.0-1.2 times) is cut randomly to generate the face image similar to the face image in the first data set, and the newly generated face image and the annotation information corresponding to the face image and consisting of the 7 pose annotations are used as the second data set.

In the embodiment of the present disclosure, a scale of the training data set is enlarged in the data augmentation mode, and when the pose estimation model is trained using the augmented training set, an influence caused by the inaccurate annotation box is reduced, and a data volume is expanded to improve robustness of the model.

In some embodiments, the training set includes a face image and annotation information, the annotation information is used as a label during model training, and the annotation information includes a plurality of annotation points corresponding to the face box and a plurality of pose angles; the annotation points of the face box include coordinates of any corner point corresponding to the face box as well as the width and height of the face box, and the pose angles include a pitch angle, a yaw angle and a roll angle.

In some embodiments, the performing feature extraction on the target image by using a shallow densely connected layer to obtain a plurality of first feature maps containing shallow feature information includes: the shallow densely connected layer including a plurality of convolution modules which are connected in sequence, sequentially performing a convolution operation on the feature maps input to the convolution modules using the convolution modules, taking output of each convolution module as input of a next convolution module, the input of each convolution module also including the output of the previous convolution module, and taking the output of the last plural convolution modules in the shallow densely connected layer as the first feature maps.

Specifically, since positions of five sense organs and an overall angle of a head portrait are required to be considered in face pose classification, part of shallow information and deep abstract information in the face image have important roles, and therefore, the embodiment of the present disclosure provides a backbone network composed of the shallow densely connected layer and the deep feature multiplexing layer. The shallow feature information and the deep feature information in the face image are extracted by the backbone network, and the shallow feature information is fused into the deep feature information to obtain the feature map containing more semantic information.

Further, when the forward features are extracted in the shallow densely connected layer, the shallow densely connected layer is divided into 5 convolution modules C1, C2, C3, C4 and C5 in the pose estimation model, and dense connection means that output of each convolution module is used as both input of a next convolution module and input of other convolution modules after the next convolution module. Therefore, the deep feature multiplexing layer can receive more shallow information, and meanwhile, a pose information expression capability of the features is improved, a utilization efficiency of the features is improved, and the features extracted from each part can be utilized by more modules.

In some embodiments, the performing an information fusion operation on the plurality of first feature maps by using the deep feature multiplexing layer to obtain a second feature map, such that deep feature information is fused into the shallow feature information includes: the deep feature multiplexing layer including convolution modules with a number corresponding to the number of the first feature maps, performing convolution transformation on the first feature maps to obtain the second feature map by the convolution modules of the deep feature multiplexing layer, such that the deep feature information is fused into the second feature map containing the shallow feature information; and performing global average pooling on the second feature map to obtain the corresponding second feature map after global average pooling.

Specifically, during the feature expression by using the deep feature multiplexing layer, by fusing the shallow feature information into the deep feature information, as shown in FIG. 1, 3 different levels of feature expression (i.e., P3, P4 and P5) are performed using the output of the convolution modules C3, C4 and C5 respectively, so as to fuse the deep feature information into the feature maps output by C3, C4 and C5. An implementation of the deep feature multiplexing layer is described in detail below with reference to FIG. 1 in the foregoing embodiment, and may specifically include the following content:

C3, C4 and C5 correspond to the convolution modules in the shallow densely connected layer, the output of C3, C4 and C5 are used as the input of P3, P4 and P5, a convolution operation is carried out on the feature maps output by C3, C4 and C5 by the convolution modules in the deep feature multiplexing layer, and the feature map containing the semantic information (i.e., the pose information) is output. When the convolution operation is performed on P3, P4, and P5, the following rule is adopted: when P3 is calculated, each of C3, C4 and C5 is subjected to 1×1 convolution transformation to a feature map of (28, 28, 512), such that P3 fuses information of C3, C4 and C5; when P4 is calculated, each of C4 and C5 is subjected to 1×1 convolution transformation to a feature map of (14, 14, 512), such that the information of C4 and C5 is fused; when P5 is calculated, C5 is subjected to 1×1 convolution transformation to a feature map of (7, 7, 512), and only the information of C5 is used. Finally, global average pooling is performed on P3, P4 and P5 to obtain feature vectors with lengths of 128, 256 and 512, and the feature vectors are input into the attention layer.

In some embodiments, the attention layer includes an SE attention module and a feature transformation module, and the extracting face pose information in the second feature map by using an attention layer to obtain a third feature map containing the face pose information includes: performing weight calculation on a feature channel in the second feature map by the SE attention module, and weighting the feature channel according to a channel weight to obtain a weighted second feature map; and performing feature extraction on the weighted second feature map by using the feature transformation module to obtain the third feature map containing effective feature information, the effective feature information containing the face pose information.

Specifically, in order to better extract the pose information from the feature information extracted by the backbone network, the present disclosure provides the Neck module based on the SE attention module and the Transformer. The SE attention module is configured to amplify important features by weighting features of different channels, and meanwhile inhibit relatively unimportant features. The Transformer has a strong feature extraction capability, and can highlight the important features and inhibit interference features.

Further, the SE attention module includes two fully connected layers and a sigmoid layer (i.e., a normalization layer), and assuming that a number of the channels of the second feature map input into the SE attention module is c, the second feature map with the channel number of c is processed by the two fully connected layers and the sigmoid layer to obtain the channel weight of each feature channel, and then, each channel weight is multiplied by the corresponding feature channel to obtain the weighted feature map.

Further, in the Transformer (feature transformation module), the input weighted feature maps are processed by multi-head attention and multi-fully-connected-layer MLPs to obtain c groups of transformed feature maps. Effective features in the feature map can be extracted using a multi-head attention mechanism of the Transformer, such that the important features are highlighted.

In some embodiments, the performing prediction on the third feature map by using a classifier to obtain a face pose prediction result corresponding to the third feature map, and determining a face pose in the target image according to the prediction result includes: each face pose corresponding to a plurality of third feature maps, each third feature map corresponding to a plurality of classifiers, and each classifier being configured to predict a plurality of angle values according to the third feature maps, calculating the pose angle predicted by each classifier according to the plurality of angle values, summing the pose angles predicted by all the classifiers to obtain the pose angle corresponding to each face pose, and taking the pose angles corresponding to three face poses as the estimation result of the face pose in the target image.

Specifically, in order to obtain precise pose angles, in the present disclosure, the grouping angle regression module, also referred to as a classifier module, i.e., the Head module part of FIG. 1, is added to the pose estimation model. For each pose angle, each group of features may contain 3 classifiers, and each classifier predicts 10 angle values. For example, the first classifier predicts probability values from 0° to 9°, and the model predicts probability values for these 10 angles (p00, p01, . . . , p09), such that the prediction result of this classifier is angle0=p01×0+p02×1+ . . . +p09×9. Finally, the results of the 9 classifiers are added to obtain the final pose angle. The 3 pose angles are calculated in this way to obtain the three finally predicted pose angles.

Further, each third feature map input into the Head module corresponds to three classifiers, each classifier is configured to predict 10 different angle values, the final prediction results of all the classifiers (9 classifiers in total) are calculated according to the prediction results of the classifiers, and the final prediction result of the Head module is used as the angle value corresponding to the current pose angle. For each pose angle, the model outputs an angle value, and the angle values corresponding to all the pose angles are used as the estimation result of the face pose in the target image.

According to the technical solution of the embodiment of the present disclosure, the data set format of 7 pose annotations (4 detection box annotation points and 3 pose angles) is adopted, and the data augmentation of the face image is designed based on the annotation solution, thereby enlarging the data volume of the training set. In the present disclosure, the backbone network for shallow dense connection and deep feature multiplexing is designed based on analysis of the pose features of the face image, thereby improving the utilization efficiency and expression capacity of the features. The present disclosure further discloses the Neck module based on SE attention and Transformer, thereby further extracting the key information of the pose. According to the present disclosure, the grouping angle regression module is added in the model, and the 3 pose angles are predicted more precisely using the 27 classifiers.

An apparatus according to the embodiments of the present disclosure is described below, and may be configured to perform the method according to the embodiments of the present disclosure. For details not disclosed in the embodiments of the apparatus according to the present disclosure, reference is made to the embodiments of the method according to the present disclosure.

Figure 3:
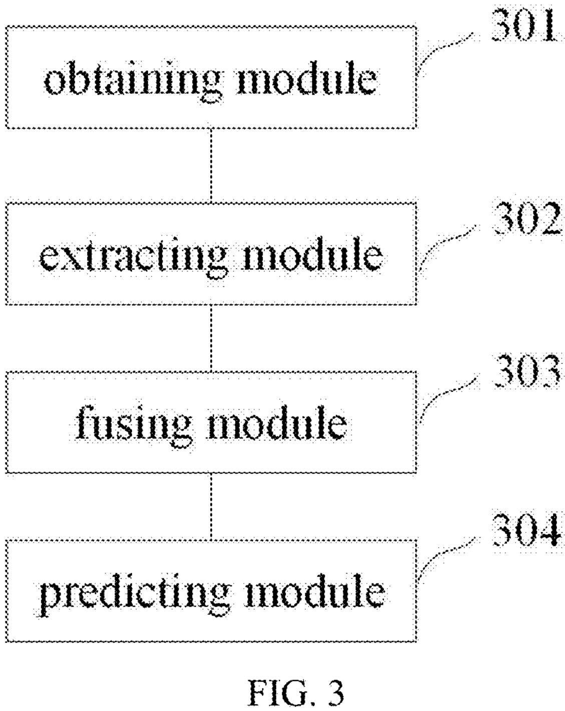
FIG. 3 is a schematic structural diagram of a face pose estimation apparatus according to an embodiment of the present disclosure.

FIG. 3 is a schematic structural diagram of a face pose estimation apparatus according to an embodiment of the present disclosure. As shown in FIG. 3, the face pose estimation apparatus includes:

an obtaining module 301 configured to obtain a target image containing face information, and input the target image into a pre-constructed pose estimation model;

an extracting module 302 configured to, in the pose estimation model, perform feature extraction on the target image by using a shallow densely connected layer to obtain a plurality of first feature maps containing shallow feature information;

a fusing module 303 configured to take the plural first feature maps as input of a deep feature multiplexing layer, and perform an information fusion operation on the plurality of first feature maps by using the deep feature multiplexing layer to obtain a second feature map, such that deep feature information is fused into the shallow feature information; and a predicting module 304 configured to extract face pose information in the second feature map by using an attention layer to obtain a third feature map containing the face pose information, perform prediction on the third feature map by using a classifier to obtain a face pose prediction result corresponding to the third feature map, and determine a face pose in the target image according to the prediction result.

In some embodiments, the obtaining module 301 of FIG. 3 further constructs the pose estimation model by: acquiring an original image containing face information, detecting the original image by using a face detection model to obtain a face image and a face box corresponding to the original image, acquiring face pose information in the original image, and generating a first data set by using the face image, position coordinates of the face box and the face pose information; cutting the original image in a preset cutting mode based on the original image and the position coordinates of the face box to obtain a cut face image, and generating a second data set by using the cut face image, the position coordinates of the face box and the face pose information; and combining the first data set and the second data set to obtain a training set, and training the pose estimation model by using the training set to obtain the trained pose estimation model.

In some embodiments, the training set includes a face image and annotation information, the annotation information is used as a label during model training, and the annotation information includes a plurality of annotation points corresponding to the face box and a plurality of pose angles; the annotation points of the face box include coordinates of any corner point corresponding to the face box as well as the width and height of the face box, and the pose angles include a pitch angle, a yaw angle and a roll angle.

In some embodiments, the shallow densely connected layer includes a plurality of convolution modules which are connected in sequence, the extracting module 302 of FIG. 3 sequentially performs a convolution operation on the feature maps input to the convolution modules using the convolution modules, takes output of each convolution module as input of a next convolution module, the input of each convolution module also including the output of the previous convolution module, and takes the output of the last plural convolution modules in the shallow densely connected layer as the first feature maps.

In some embodiments, the deep feature multiplexing layer includes convolution modules with a number corresponding to the number of the first feature maps, and the fusing module 303 of FIG. 3 performs convolution transformation on the first feature maps to obtain the second feature map by the convolution modules of the deep feature multiplexing layer, such that the deep feature information is fused into the second feature map containing the shallow feature information; and performs global average pooling on the second feature map to obtain the corresponding second feature map after global average pooling.

In some embodiments, the attention layer includes an SE attention module and a feature transformation module, and the predicting module 304 of FIG. 3 performs weight calculation on a feature channel in the second feature map by the SE attention module, and weights the feature channel according to a channel weight to obtain a weighted second feature map; and performs feature extraction on the weighted second feature map by using the feature transformation module to obtain the third feature map containing effective feature information, the effective feature information containing the face pose information.

In some embodiments, each face pose corresponds to a plurality of third feature maps, each third feature map corresponds to a plurality of classifiers, each classifier is configured to predict a plurality of angle values according to the third feature maps, the pose angle predicted by each classifier is calculated according to the plurality of angle values, the pose angles predicted by all the classifiers are summed to obtain the pose angle corresponding to each face pose, and the pose angles corresponding to three face poses are taken as the estimation result of the face pose in the target image.

It should be understood that, the sequence numbers of the steps in the foregoing embodiments do not imply an execution sequence, and the execution sequence of each process should be determined by functions and internal logic of the process, and should not constitute any limitation to the implementation process of the embodiments of the present disclosure.

Figure 4:
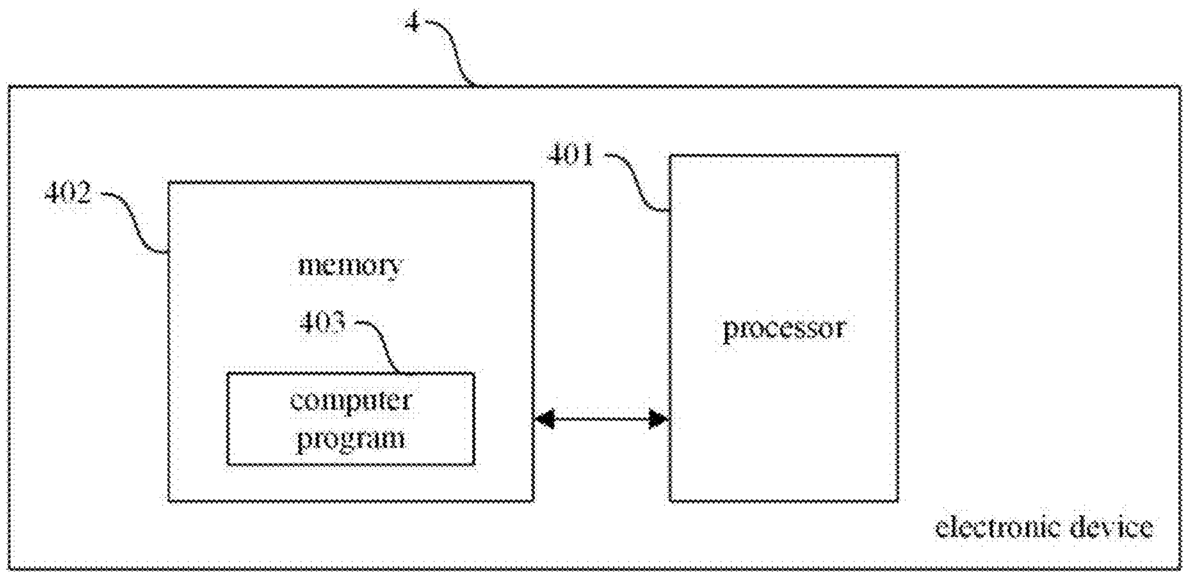
FIG. 4 is a schematic structural diagram of an electronic device according to an embodiment of the present disclosure.

FIG. 4 is a schematic structural diagram of an electronic device 4 according to an embodiment of the present disclosure. As shown in FIG. 4, the electronic device 4 according to the present embodiment includes: a processor 401, a memory 402, and a computer program 403 stored in the memory 402 and executable on the processor 401. The steps in the various method embodiments described above are implemented when the processor 401 executes the computer program 403. Alternatively, the processor 401 achieves the functions of each module/unit in each apparatus embodiment described above when executing the computer program 403.

Exemplarily, the computer program 403 may be partitioned into one or more modules/units, which are stored in the memory 402 and executed by the processor 401 to complete the present disclosure. One or more of the modules/units may be a series of computer program instruction segments capable of performing specific functions, the instruction segments describing the execution of the computer program 403 in the electronic device 4.

The electronic device 4 may be a desktop computer, a notebook, a palm computer, a cloud server or another electronic device. The electronic device 4 may include, but is not limited to, the processor 401 and the memory 402. Those skilled in the art may understand that a structure shown in FIG. 4 is only an example of the electronic device 4 and does not limit the electronic device 4, which may include more or fewer components than those shown in the drawings, or some components may be combined, or a different component deployment may be used. For example, the electronic device may further include an input/output device, a network access device, a bus, or the like.

The processor 401 may be a Central Processing Unit (CPU), or other general-purpose processors, Digital Signal Processors (DSP), Application Specific Integrated Circuits (ASIC), Field-Programmable Gate Arrays (FPGA) or other programmable logic devices, discrete gates or transistor logic devices, discrete hardware components, etc. The general-purpose processor may be a microprocessor or the processor may be any general processor, or the like.

The memory 402 may be an internal storage unit of the electronic device 4, for example, a hard disk or memory of the electronic device 4. The memory 402 may also be an external storage device of the electronic device 4, such as a plug-in hard disk, a Smart Media Card (SMC), a Secure Digital (SD) Card, a Flash Card, or the like, configured on the electronic device 4. Further, the memory 402 may also include both the internal storage unit and the external storage device of the electronic device 4. The memory 402 is configured to store the computer program and other programs and data required by the electronic device. The memory 402 may be further configured to temporarily store data which has been or will be outputted.

It may be clearly understood by those skilled in the art that, for convenient and brief description, division of the above functional units and modules is used as an example for illustration. In practical application, the above functions can be allocated to different functional units and modules and implemented as required; that is, an internal structure of the apparatus is divided into different functional units or modules to accomplish all or some of the functions described above. The functional units or modules in the embodiments may be integrated into one processing unit, or each of the units may exist alone physically, or two or more units are integrated into one unit, and the integrated unit may be implemented in a form of hardware, or may also be implemented in a form of a software functional unit. In addition, specific names of all the functional units or modules are merely for facilitating the differentiation, but are not intended to limit the protection scope of this application. For a specific working process of the units or modules in the above system, reference may be made to the corresponding process in the foregoing method embodiments, which is not repeated herein.

In the above embodiments, the description of each embodiment has its own emphasis. For a part not described in detail in one embodiment, reference may be made to relevant description of other embodiments.

Those of ordinary skill in the art would appreciate that the units and algorithmic steps of the examples described in combination with the embodiments disclosed herein can be implemented by electronic hardware or a combination of computer software and electronic hardware. Whether these functions are performed by hardware or software depends on a specific application and design constraints of the technical solution. Technical professionals may achieve the described functions in different methods for each particular application, but such implementation should not be considered beyond the scope of the present disclosure.

In the embodiments according to the present disclosure, it is to be understood that the disclosed apparatus/computer device and method can be implemented in other ways. For example, the embodiment of the apparatus/computer device described above is merely schematic. For example, the division of the modules or units is merely logical function division, and there may be other division manners in an actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between apparatuses or units may be implemented in an electric form, a mechanical form, or other forms.

The units described as separate parts may or may not be physically separate, and parts displayed as units may or may not be physical units, may be located at one position, or may be distributed on a plurality of network units. Some or all of the units may be selected according to actual needs to achieve the objectives of the solutions of the embodiments.

In addition, the functional units in the embodiments of the present disclosure may be integrated into one processing unit, or each of the units may exist alone physically, or two or more units are integrated into one unit. The integrated unit may be implemented in a form of hardware or in a form of a software functional unit.

The integrated module/unit may be stored in a computer-readable storage medium when implemented in the form of the software functional unit and sold or used as a separate product. Based on such understanding, all or some of the processes in the method according to the above embodiments may be realized in the present disclosure, or completed by the computer program instructing related hardware, the computer program may be stored in the computer-readable storage medium, and when the computer program is executed by the processor, the steps of the above method embodiments may be realized. The computer program may include a computer program code, which may be in a form of a source code, an object code or an executable file or in some intermediate forms. The computer-readable medium may include any entity or apparatus capable of carrying the computer program code, a recording medium, a USB flash drive, a removable hard disk, a magnetic disk, an optical disk, a computer memory, a Read-Only Memory (ROM), a Random Access Memory (RAM), an electrical carrier signal, a telecommunication signal, a software distribution medium, and so on. It should be noted that content included in the computer-readable medium may be appropriately increased or decreased according to requirements of legislation and patent practice in a jurisdiction, for example, in some jurisdictions, according to legislation and patent practice, the computer-readable medium does not include the electrical carrier signal and the telecommunication signal.

The above embodiments are merely intended to describe the technical solutions of the present disclosure, but not to limit the present disclosure. Although the present disclosure is described in detail with reference to the foregoing embodiments, those of ordinary skill in the art should understand that they may still make modifications to the technical solutions described in the foregoing embodiments or make equivalent replacements to some technical features thereof. Such modifications or replacements do not cause the essence of the corresponding technical solutions to depart from the spirit and scope of the technical solutions of the embodiments of the present disclosure, and should be included in the protection scope of the present disclosure.

What is claimed is:

1. A face pose estimation method, comprising:

obtaining a target image containing face information, and inputting the target image into a pre-constructed pose estimation model;

in the pre-constructed pose estimation model, performing feature extraction on the target image by using a shallow densely connected layer to obtain a plurality of first feature maps containing shallow feature information;

taking the plurality of first feature maps as input of a deep feature multiplexing layer, and performing an information fusion operation on the plurality of first feature maps by using the deep feature multiplexing layer to obtain a second feature map, wherein deep feature information is fused into the shallow feature information; and extracting face pose information in the second feature map by using an attention layer to obtain a third feature map containing the face pose information, performing prediction on the third feature map by using a classifier to obtain a face pose prediction result corresponding to the third feature map, and determining a face pose in the target image according to the face pose prediction result.

2. The face pose estimation method according to claim 1, wherein the pose estimation model is constructed by:

acquiring an original image containing face information, detecting the original image by using a face detection model to obtain a face image and a face box corresponding to the original image, acquiring face pose information in the original image, and generating a first data set by using the face image, position coordinates of the face box and the face pose information;

cutting the original image in a preset cutting mode based on the original image and the position coordinates of the face box to obtain a cut face image, and generating a second data set by using the cut face image, the position coordinates of the face box and the face pose information; and combining the first data set and the second data set to obtain a training set, and training the pose estimation model by using the training set to obtain a trained pose estimation model.

3. The face pose estimation method according to claim 2, wherein the training set comprises a face image and annotation information, the annotation information is configured as a label during model training, and the annotation information comprises a plurality of annotation points corresponding to the face box and a plurality of pose angles;

the plurality of annotation points of the face box comprise coordinates of any corner point corresponding to the face box as well as width and height of the face box, and the plurality of pose angles comprise a pitch angle, a yaw angle and a roll angle.

4. The face pose estimation method according to claim 1, wherein a step of, in the pre-constructed pose estimation model, performing the feature extraction on the target image by using the shallow densely connected layer to obtain the plurality of first feature maps containing the shallow feature information comprises:

the shallow densely connected layer comprising a plurality of convolution modules which are connected in sequence, sequentially performing a convolution operation on feature maps input to the plurality of convolution modules using the plurality of convolution modules, taking output of each of the plurality of convolution modules as input of a next convolution module, the input of each of the plurality of convolution modules further comprising the output of a previous convolution module, and taking the output of the last plurality of convolution modules in the shallow densely connected layer as the plurality of first feature maps.

5. The face pose estimation method according to claim 1, wherein a step of performing the information fusion operation on the plurality of first feature maps by using the deep feature multiplexing layer to obtain the second feature map, wherein the deep feature information is fused into the shallow feature information comprises:

the deep feature multiplexing layer comprising convolution modules with a number corresponding to the number of the plurality of first feature maps, performing convolution transformation on the plurality of first feature maps to obtain the second feature map by the convolution modules of the deep feature multiplexing layer, wherein the deep feature information is fused into the second feature map containing the shallow feature information; and performing global average pooling on the second feature map to obtain the corresponding second feature map after the global average pooling.

6. The face pose estimation method according to claim 1, wherein the attention layer comprises a squeeze-and-excitation (SE) attention module and a feature transformation module, and a step of extracting the face pose information in the second feature map by using the attention layer to obtain the third feature map containing the face pose information comprises:

performing weight calculation on a feature channel in the second feature map by the SE attention module, and weighting the feature channel according to a channel weight to obtain a weighted second feature map; and performing feature extraction on the weighted second feature map by using the feature transformation module to obtain the third feature map containing effective feature information, the effective feature information containing the face pose information.

7. The face pose estimation method according to claim 1, wherein a step of performing the prediction on the third feature map by using the classifier to obtain the face pose prediction result corresponding to the third feature map, and determining the face pose in the target image according to the face pose prediction result comprises:

each face pose corresponding to a plurality of third feature maps, each of the plurality of third feature maps corresponding to a plurality of classifiers, and each of the plurality of classifiers being configured to predict a plurality of angle values according to the plurality of third feature maps, calculating a pose angle predicted by each of the plurality of classifiers according to the plurality of angle values, summing the pose angles predicted by all the plurality of classifiers to obtain the pose angle corresponding to each face pose, and taking the pose angles corresponding to three face poses as an estimation result of the face pose in the target image.

8. An electronic device, comprising a memory, a processor and a computer program stored on the memory and runnable on the processor, wherein the processor, when executing the computer program, implements the face pose estimation method according to claim 1.

9. A non-transitory computer-readable storage medium storing a computer program, wherein the computer program, when executed by a processor, implements the face pose estimation method according to claim 1.

* * * * *